US 6,977,099 B2

(12) United States Patent
Umeya et al.

(10) Patent No.: US 6,977,099 B2
(45) Date of Patent: Dec. 20, 2005

(54) LIQUID CRYSTALLINE TRANSFER SHEET AND PROCESS OF PRODUCING THE SAME

(75) Inventors: Masanori Umeya, Shinjuku-ku (JP); Keiji Kashima, Shinjuku-ku (JP); Hideo Fujimura, Sinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 284 days.

(21) Appl. No.: 10/204,552

(22) PCT Filed: Dec. 27, 2001

(86) PCT No.: PCT/JP01/11568

§ 371 (c)(1),
(2), (4) Date: Aug. 22, 2002

(87) PCT Pub. No.: WO02/052309

PCT Pub. Date: Jul. 4, 2002

(65) Prior Publication Data

US 2003/0031845 A1    Feb. 13, 2003

(30) Foreign Application Priority Data

Dec. 27, 2000  (JP)  .............................. 2000-398608

(51) Int. Cl.[7] .......................................... C09K 19/00
(52) U.S. Cl. ...................... 428/1.1; 428/1.2; 428/41.8; 428/914; 428/1.23; 428/1.6; 428/411.1; 428/156; 427/37.22; 427/487; 156/272.2; 156/273.2; 156/275.5; 349/56; 349/106; 349/107; 359/566
(58) Field of Search .................... 359/566; 428/411.1, 428/1.23, 1.6, 1.1, 1.2, 156, 41.8, 914; 349/56, 349/106, 107; 928/1.1; 427/372.2, 487; 156/272.2, 156/273.2, 275.5

(56) References Cited

U.S. PATENT DOCUMENTS

| | | | | | |
|---|---|---|---|---|---|
| 5,516,455 A | * | 5/1996 | Jacobine et al. | ....... | 252/299.01 |
| 6,671,031 B1 | * | 12/2003 | Nishimura | .................. | 349/201 |

FOREIGN PATENT DOCUMENTS

| EP | 0 573 278 A2 | 12/1993 | |
| --- | --- | --- | --- |
| EP | 0 881 510 A2 | 12/1998 | |
| EP | 0881510 A2 | * 12/1998 | ............ G02B 5/30 |
| JP | 5-333313 | 12/1993 | |

(Continued)

OTHER PUBLICATIONS

Patent Abstracts of Japan, vol. 015, No. 415 (P-1265), (Oct. 22, 1991) & JP 03 168613 A, (Dai Nippon Printing Co., Ltd.) (Jul. 22, 1991) Abstract.

(Continued)

*Primary Examiner*—Rena Dye
*Assistant Examiner*—Tamra L. Dicus
(74) *Attorney, Agent, or Firm*—Oliff & Berridge, PLC

(57) ABSTRACT

A liquid crystalline transfer sheet 10 includes a liquid crystal layer 12 formed on the surface of a substrate 14, where the surface hardness of the liquid crystal layer 12 is higher on the releasing surface 12A side, which is on the substrate 14 side, than on the adhering surface 12B side, which is on the receiving object 16 side. Therefore, the adhesion between the adhering surface 12B of the liquid crystal layer 12 and the receiving object 16 becomes stronger than that between the releasing surface 12A of the liquid crystal layer 12 and the substrate 14. It is thus possible to securely transfer the liquid crystal layer 12 to the receiving object 16 without leaving a part of the liquid crystal layer 12 on the substrate 14.

14 Claims, 4 Drawing Sheets

FOREIGN PATENT DOCUMENTS

| | | |
|---|---|---|
| JP | 08-271731 | 10/1996 |
| JP | 09-178937 | 7/1997 |
| JP | 09-292618 | 11/1997 |
| JP | 09-304770 | 11/1997 |
| JP | 10-197892 | 7/1998 |
| JP | 11-293252 | 10/1999 |
| JP | 2000-284123 | 10/2000 |
| JP | 2001-004824 | 1/2001 |
| JP | 2001-159708 | 6/2001 |
| JP | 2001-159706 | 8/2001 |
| JP | 2002-212561 | 7/2002 |
| JP | 2002-268056 | 9/2002 |

OTHER PUBLICATIONS

Patent Abstracts of Japan, vol. 017, No. 368 (M-1443), (Jul. 12, 1993) & JP 05 057857 A (Fujimori Kogyo KK), (Mar. 9, 1993) Abstract.

Database WPI, Section Ch, Week 199706 Derwent Publications Ltd., London, GB; AN 1997-062055 XP002270326 & JP 08 311418 A (Sekisui Chem Ind Co Ltd), (Nov. 26, 1996) Abstract.

* cited by examiner

LIQUID CRYSTALLINE TRANSFER SHEET AND PROCESS OF PRODUCING THE SAME

TECHNICAL FIELD

The present invention relates to a liquid crystalline transfer sheet for transferring, to a receiving object, a liquid crystal layer having optical activities such as light-polarizing activity. More particularly, the present invention relates to a liquid crystalline transfer sheet for transferring a liquid crystal layer formed on the surface of a substrate to a receiving object by separating the liquid crystal layer from the substrate, and to a process of producing such a liquid crystalline transfer sheet.

BACKGROUND ART

In the liquid crystalline transfer sheet as described above, a release layer or easily separable adhesive layer has conventionally been provided between the liquid crystal layer and the substrate so that the liquid crystal layer can easily be separated from the substrate, thereby making it possible to successfully transfer the liquid crystal layer to a receiving object.

To transfer the liquid crystal layer to a receiving object, it is necessary to stick the liquid crystal layer to the receiving object. Having been commonly employed for this purpose is such a conventional means that an adhesive layer is provided between the liquid crystal layer and a receiving object to which the liquid crystal layer is transferred. Specifically, an adhesive layer is provided in advance either on the transfer-side surface of the liquid crystal layer (surface to be adhered to a receiving object) or on a receiving object. Alternatively, an adhesive layer is formed on the transfer-side surface of the liquid crystal layer or on a receiving object in the process of transferring the liquid crystal layer to the receiving object.

Another means for sticking the liquid crystal layer to a receiving object is thermocompression bonding.

The above-described liquid crystalline transfer sheet containing a release layer or easily separable adhesive layer provided between the liquid crystal layer and the substrate is to have an increased number of layers, so that it has complicated constitution of lamination. Moreover, the substances constituting the release layer or easily separable adhesive layer can mingle with the liquid crystal layer or can partially stick to the liquid crystal layer when the liquid crystal layer is separated; the liquid crystal layer that has been transferred to a receiving object can thus show lowered optical properties.

Of the aforementioned liquid crystalline transfer sheets, a liquid crystalline transfer sheet of the type which the liquid crystal layer is adhered to a receiving object through an adhesive layer is disadvantageous in that the liquid crystal layer transferred to the receiving object shows lowered optical properties because of the adhesive layer provided. One cause of this lowering of the optical properties is interfacial reflection that occurs at the interface of the adhesive layer and the liquid crystal layer as well as at the interface of the adhesive layer and the receiving object. Another cause is as follows: the adhesive layer changes its shape because of its fluidity when transferred to a highly even receiving object, so that the thickness of the adhesive layer becomes non-uniform; as a result, the liquid crystal layer adhered to the receiving object through such an adhesive layer is to have decreased evenness.

Further, it is not easy to make an adhesive layer thin (1 $\mu$m or less), so that it inevitably has a thickness to some extent. Many adhesive layers are therefore colored, or cause separation, or yellow, when heated as disclosed in Japanese Laid-Open Patent Publications No. 313729/1996, No. 29325/1999, No. 75924/1996, No. 151877/1999, etc. In particular, adhesive layers made from acrylic resins, as disclosed in Japanese Laid-Open Patent Publication No. 28827/2000, are known to yellow at high temperatures of more than 200° C.

Of the above-described liquid crystalline transfer sheets, a liquid crystalline transfer sheet of the type which the liquid crystal layer is adhered to a receiving object via thermocompression bonding is also disadvantageous in that it is not easy to peel the substrate from the liquid crystal layer after the liquid crystal layer formed on the substrate has been adhered to a receiving object via thermocompression bonding, if the release layer, easily separable adhesive layer or adhesive layer as described above is not provided.

The above-described phenomenon depends on materials for the substrate and the receiving object, and occurs when the adhesion between the liquid crystal layer to be transferred and the substrate is stronger than the adhesion between the liquid crystal layer and the receiving object. In such a case, it is not easy to peel the substrate from the liquid crystal layer after the liquid crystal layer has been adhered to the receiving object. In particular, if the liquid crystal layer is extremely thin, it can be broken when the substrate is tried to peel from the liquid crystal layer. In addition, as disclosed in Japanese Laid-Open Patent Publication No. 311710/1999, for example, there is such a case where a cholesteric liquid crystal layer is adhered to another cholesteric liquid crystal layer via thermocompression bonding. Even in this case, if the cholesteric liquid crystal layers are thin or the adhesion between the cholesteric liquid crystal layer and the substrate is stronger than that between the cholesteric liquid crystal layers, it is difficult to transfer the cholesteric liquid crystal layers to a receiving object, and the cholesteric liquid crystal layers can be damaged (broken).

DISCLOSURE OF THE INVENTION

The present invention was accomplished in the light of the above-described drawbacks in the related art. An object of the present invention is to provide a liquid crystalline transfer sheet comprising a liquid crystal layer adapted to securely and easily be transferred, without being damaged, to a receiving object, even if a release layer, easily separable adhesive layer or adhesive layer is not provided, and to provide a process of producing such a liquid crystalline transfer sheet.

A first aspect of the present invention is a liquid crystalline transfer sheet comprising: a substrate; and a liquid crystal layer formed on the surface of the substrate, the liquid crystal layer being able to be adhered to a receiving object with its adhering surface, the surface on the side opposite to the substrate, and being able to be separated from the substrate at its releasing surface, the surface on the substrate side, wherein the surface hardness of the liquid crystal layer is lower on the adhering surface side than on the releasing surface side.

In the liquid crystalline transfer sheet according to the first aspect of the present invention, it is preferable that the liquid crystal layer be made from polymerizable liquid crystalline molecules and that the rate of residual double bonds of the liquid crystalline molecules in the vicinity of the adhering surface of the liquid crystal layer be higher than that of the liquid crystalline molecules in the vicinity of the releasing surface of the liquid crystal layer. It is also preferable that the rate of residual double bonds of the liquid crystalline molecules in the vicinity of the releasing surface of the liquid crystal layer is 60% or less of that of the liquid crystalline molecules in the vicinity of the adhering surface of the liquid crystal layer.

Further, in the liquid crystalline transfer sheet according to the first aspect of the present invention, it is preferable that the liquid crystal layer be composed of a plurality of thin liquid crystal layers successively laminated. It is also preferable that each thin liquid crystal layer be made from polymerizable liquid crystalline molecules and that the rate of residual double bonds of the liquid crystalline molecules in the thin liquid crystal layer in the vicinity of the adhering surface be higher than that of the liquid crystalline molecules in the thin liquid crystal layer in the vicinity of the releasing surface. It is also preferable that the rate of residual double bonds of the liquid crystalline molecules in the thin liquid crystal layer that forms the releasing surface is 60% or less of that of the liquid crystalline molecules in the thin liquid crystal layer that forms the adhering surface.

Furthermore, in the liquid crystalline transfer sheet according to the first aspect of the present invention, it is preferable that the liquid crystal layer made from the liquid crystalline molecules be cholesteric. It is also preferable that the substrate be an oriented film. It is also preferable that an alignment layer be formed on one surface of the substrate, the surface being brought into contact with the releasing surface of the liquid crystal layer.

The second aspect of present invention is a process of producing a liquid crystalline transfer sheet comprising a substrate and a liquid crystal layer formed on the surface of the substrate, the liquid crystal layer being able to be adhered to a receiving object with its adhering surface, the surface on the side opposite to the substrate, and being able to be separated from the substrate at its releasing surface, the surface on the substrate side. The process comprises the steps of: forming, on a substrate, a liquid crystal layer by using liquid crystalline molecules polymerizable by application of radiation; and curing the liquid crystal layer by application of radiation in an atmosphere of air so that the surface hardness of the liquid crystal layer is lower on the adhering surface side than on the releasing surface side.

In the process of producing a liquid crystal line transfer sheet according to the second aspect of the present invention, it is preferable that the atmosphere of air be an atmosphere with an oxygen concentration of 0.5% or more.

A third aspect of the present invention is a process of producing a liquid crystalline transfer sheet comprising a substrate and a liquid crystal layer composed of a plurality of thin liquid crystal layers, formed on the surface of the substrate, the liquid crystal layer being able to be adhered to a receiving object with its adhering surface, the surface on the side opposite to the substrate, and being able to be separated from the substrate at its releasing surface, the surface on the substrate side. The process comprises the steps of: forming, on a substrate, a thin liquid crystal layer by using liquid crystalline molecules polymerizable by application of radiation; curing the thin liquid crystal layer by application of radiation; forming an additional thin liquid crystal layer on the cured thin liquid crystal layer by using liquid crystalline molecules polymerizable by application of radiation; and curing the additional thin liquid crystal layer by application of radiation, wherein the step of forming the additional thin liquid crystal layer and the step of curing the additional thin liquid crystal layer are repeated one or more times to successively laminate the desired number of thin liquid crystal layers, and the degree of cure of each thin liquid crystal layer is controlled so that the hardness of the thin liquid crystal layer in the vicinity of the adhering surface is lower than that of the thin liquid crystal layer in the vicinity of the releasing surface.

In the process of producing a liquid crystalline transfer sheet according to the third aspect of the present invention, it is preferable to control the degree of cure of each thin liquid crystal layer by adjusting the oxygen concentration of the atmosphere in which radiation is applied to the thin liquid crystal layer. It is also preferable to control the degree of cure of each thin liquid crystal layer by adjusting the amount of radiation to be applied to the thin liquid crystal layer.

A fourth aspect of the present invention is a process of producing a liquid crystalline transfer sheet comprising a substrate and a liquid crystal layer composed of a plurality of thin liquid crystal layers, formed on the surface of the substrate, the liquid crystal layer being able to be adhered to a receiving object with its adhering surface, the surface on the side opposite to the substrate, and being able to be separated from the substrate at its releasing surface, the surface on the substrate side. The process comprises the steps of: laminating, on a substrate, the desired number of thin liquid crystal layers by using liquid crystalline molecules polymerizable by application of ultraviolet light; and curing the laminated thin liquid crystal layers by application of ultraviolet light, wherein the degree of cure of each thin liquid crystal layer Is controlled by adjusting the amount of a photopolymerization initiator to be added to the thin liquid crystal layer so that the hardness of the thin liquid crystal layer in the vicinity of the adhering surface is lower than that of the thin liquid crystal layer in the vicinity of the releasing surface.

According to the present invention, the surface hardness of the liquid crystal layer on its releasing surface side, which is on the substrate side, and that of the liquid crystal layer on its adhering surface side, which is on the receiving object side, are respectively adjusted, so that the adhesion between the adhering surface of the liquid crystal layer and a receiving object will be stronger than that between the releasing surface of the liquid crystal layer and the substrate. It is therefore possible to securely stick the liquid crystal layer to the receiving object and, at the same time, to easily peel the substrate from the liquid crystal layer. It is thus possible to securely and easily transfer the liquid crystal layer to a receiving object without damaging the liquid crystal layer or partially leaving the liquid crystalline component of the liquid crystal layer on the substrate, even if a release layer, easily separable adhesive layer or adhesive layer is not provided.

Further, according to the present invention, since it is not necessary to provide a release layer or easily separable adhesive layer between the liquid crystal layer and the substrate of the liquid crystalline transfer sheet, the liquid crystalline transfer sheet of the invention is simple in the constitution of lamination and has no chance that substances constituting a release layer or easily separable adhesive layer mingle with the liquid crystal layer or partially remain on the liquid crystal layer in the course of separation.

Furthermore, according to the present invention, there is no need to provide an adhesive layer between the liquid crystal layer of the liquid crystalline transfer sheet and a receiving object, so that only a decreased number of interfaces are to exist. Therefore, the liquid crystal layer does not undergo lowering of the optical properties that is caused by interfacial reflection. Moreover, since the liquid crystal layer is directly adhered to the receiving object, if the evenness of the receiving object is high, this evenness can be maintained, and lowering of the optical properties of the liquid crystal layer can thus be prevented. In addition, the liquid crystal layer is free from change in color tone, separation, and yellowing upon heating, which are brought about by the adhesive layer.

BEST MODE FOR CARRYING OUT THE INVENTION

By referring to the accompanying drawings, embodiments of the present invention will be described hereinafter.

First Embodiment

Figure 1:
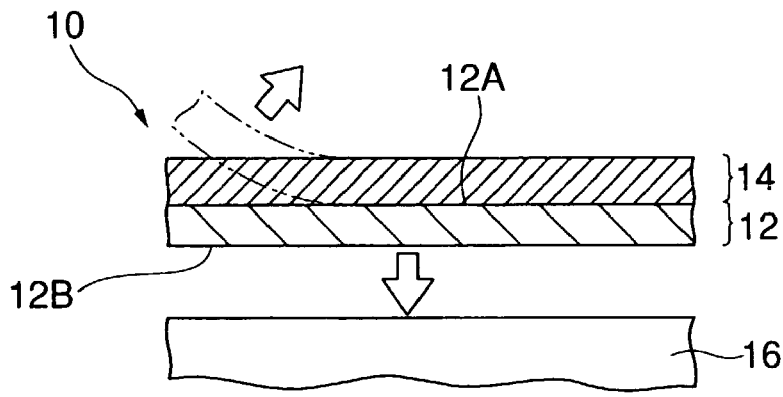
FIG. 1 is an enlarged diagrammatical cross-sectional view showing a liquid crystalline transfer sheet according to the first embodiment of the present invention.
Figure 2:
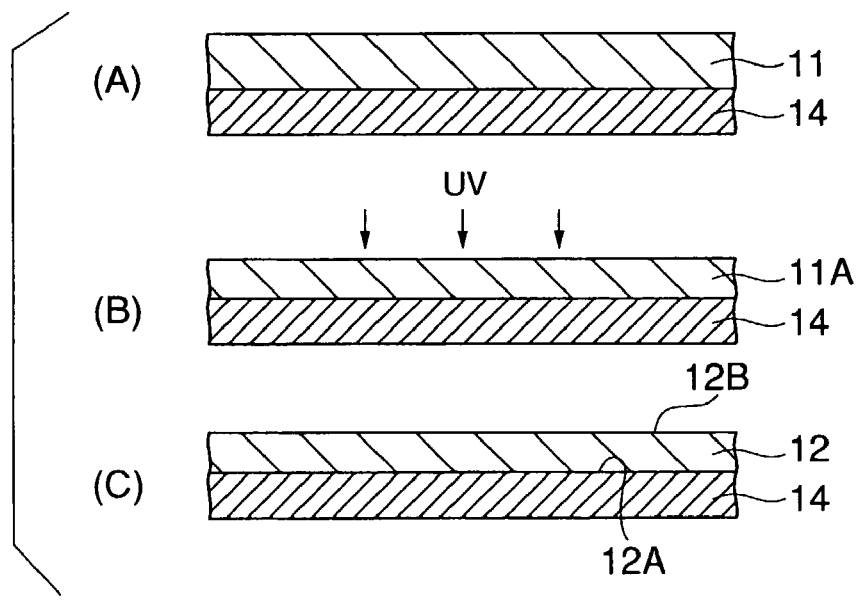
FIG. 2 is a diagrammatical cross-sectional view illustrating a process of producing the liquid crystalline transfer sheet shown in FIG. 1.

The first embodiment of the present invention will be firstly described by referring to FIGS. 1 and 2.

As shown in FIG. 1, a liquid crystalline transfer sheet 10 according to the first embodiment of the present invention includes a liquid crystal layer 12 formed on the surface of a substrate 14 made of an oriented PET (polyethylene terephthalate) film, for example. The liquid crystal layer 12 is made so that it can be adhered to a receiving object 16 with its adhering surface 12B, the surface on the side opposite to the substrate 14. The liquid crystal layer 12 is also made so that it can be separated from the substrate 14 at its releasing surface 12A, the surface on the substrate 14 side. The surface hardness of the liquid crystal layer 12 is made higher on the releasing surface 12A side, on which the liquid crystal layer 12 is separated from the substrate 14, than on the adhering surface 12B side, on which the liquid crystal layer 12 is adhered to the receiving object 16.

The liquid crystal layer 12 is formed by the use of a photopolymerizable liquid crystal (e.g., cholesteric liquid crystal), which is oriented when brought into contact with the substrate 14 made of an oriented PET film, and its surface hardness is made different between the releasing surface 12A side and the adhering surface 12B side as described above by controlling the curing conditions, as will be described later. To form the liquid crystal layer 12, not only liquid crystalline molecules (liquid crystalline monomer or oligomer) polymerizable by the application of ultraviolet light or the like but also a polymeric liquid crystal can be used, as will be described later.

The term "liquid crystal layer" herein refers to a film whose certain part has the properties (especially, optical properties) of liquid crystals and does not mean the state of liquid crystalline phase in a physical sense. For example, the liquid crystal layer herein includes even a non-fluid film as long as it has been solidified with the molecular orientation of liquid crystal phase (e.g., cholesteric liquid crystal phase) maintained.

Next, a process of producing the liquid crystalline transfer sheet 10 shown in FIG. 1 (method for making the surface hardness of the liquid crystal layer 12 different between the releasing surface 12A side and the adhering surface 12B side) will be explained by referring to FIG. 2. The explanation will be given by taking as an example a case where a cholesteric liquid crystalline monomer polymerizable by the application of ultraviolet light is used to form the liquid crystal layer 12.

A cholesteric liquid crystalline monomer solution containing a photopolymerization initiator is firstly prepared. This solution is applied, as indicated by reference numeral 11 in FIG. 2(A), to the surface of the substrate 14 made of an oriented PET film and is then dried to remove the solvent, thereby forming an uncured liquid crystal layer 11A as shown in FIG. 2(B).

Next, as shown in FIG. 2(B), ultraviolet light is applied to this uncured liquid crystal layer 11A and the substrate 14 from the liquid crystal layer 11A side in an atmosphere of air (oxygen concentration: approximately 20%), thereby curing the liquid crystal layer 11A. A liquid crystalline transfer sheet 10 including a cured liquid crystal layer 12 can thus be obtained as shown in FIG. 2(C).

The adhering surface 12B of the liquid crystal layer 12 is exposed to the air, so that cleavage of C=C bonds in the liquid crystalline molecules (e.g., double bond between carbon atoms in acrylic group contained in the cholesteric liquid crystalline molecule, etc.) are suppressed. On the other hand, the releasing surface 12A of the liquid crystal layer 12 is not in contact with oxygen, so that curing proceeds more greatly on the releasing surface 12A side. The surface hardness of the liquid crystal layer 12 thus becomes lower on the adhering surface 12B side than on the releasing surface 12A side.

For this reason, when the liquid crystal layer 12 is transferred to the receiving object 16, as shown in FIG. 1, the adhesion between the adhering surface 12B of the liquid crystal layer 12 and the receiving object 16 becomes stronger than that between the releasing surface 12A of the liquid crystal layer 12 and the substrate 14. The substrate 14 can thus be easily peeled from the liquid crystal layer 12 with the liquid crystal layer 12 adhered to the receiving object 16.

The surface hardness (degree of cure at the surface) of the liquid crystal layer 12 can be determined by the rate of residual double bonds of the liquid crystalline molecules in the vicinity of the releasing surface 12A and that of the liquid crystalline molecules in the vicinity of the adhering surface 12B. (The "liquid crystalline molecules" herein include monomers, oligomers, polymers and every other liquid crystalline compound having reactive C=C bonds.)

The "rate of residual double bonds" as used herein is defined as follows:

Rate of residual double bonds=[Spectral band intensity of absorption (in the vicinity of 810 $cm^{-1}$) characteristic of C=C bonds in liquid crystalline molecules]÷[Spectral band intensity of absorption (in the vicinity of 1500 $cm^{-1}$) characteristic of aromatic rings in liquid crystalline molecules].

The above-defined rate of residual double bonds directly indicates the rate of unreacted double bonds (C=C bonds) remaining after polymerization reaction, and [(1−(rate of residual double bonds)] indicates the degree of conversion (degree of polymerization).

As mentioned above, the surface hardness of the liquid crystal layer 12 is made lower on the adhering surface 12B side than on the releasing surface 12A side. This means that the rate of residual double bonds of the liquid crystalline molecules in the vicinity of the adhering surface 12B of the liquid crystal layer 12 is made higher than that of the liquid crystalline molecules in the vicinity of the releasing surface 12A of the liquid crystal layer 12. Preferably, the surface hardness of the liquid crystal layer 12 on the adhering surface 12B side and that of the liquid crystal layer 12 on the releasing surface 12A side are made so that the rate of residual double bonds on the releasing surface 12A side will be 60% or less of that on the adhering surface 12B side.

In the case where the liquid crystal layer 11A is cured by the application of ultraviolet light, the oxygen concentration of the atmosphere of air under which the curing is conducted is preferably 0.5% or more. This is because, if the oxygen concentration is too low, no difference in degree of conversion is caused between the releasing surface 12A side and adhering surface 12B side of the liquid crystal layer 12.

Radiation such as an electron beam may be applied instead of ultraviolet light. In this case, a photopolymerization initiator may not be added to the cholesteric liquid crystalline monomer solution that is applied to the surface of the substrate 14.

According to the liquid crystalline transfer sheet 10 of the first embodiment of the present invention, the surface hardness of the liquid crystal layer 12 on the releasing surface 12A side, which is on the substrate 14 side, and that of the liquid crystal layer 12 on the adhering surface 12B side, which is on the receiving object 16 side, are adjusted so that the adhesion between the adhering surface 12B of the liquid crystal layer 12 and the receiving object 16 will be stronger than that between the releasing surface 12A of the liquid crystal layer 12 and the substrate 14. Therefore, it is possible to securely stick the liquid crystal layer 12 to the receiving object 16, and, at the same time, to easily peel the substrate 14 from the liquid crystal layer 12. It is thus possible to securely and easily transfer the liquid crystal layer 12 to the receiving object 16 without damaging the liquid crystal layer 12 or partly leaving the liquid crystalline component of the liquid crystal layer 12 on the substrate 14, even if a release layer, easily separable adhesive layer or adhesive layer is not employed.

Second Embodiment

A liquid crystalline transfer sheet according to the second embodiment of the present invention will be described by referring to FIGS. 3 and 4. The second embodiment of the present invention is basically the same as the aforementioned first embodiment except that the liquid crystal layer in the second embodiment is composed of a plurality of thin liquid crystal layers. It is noted that like reference characters designate like or corresponding parts in the accompanying drawings and that those parts that have been explained in the description of the first embodiment will not be explained anymore in detail in the description of this second embodiment.

Figure 3:
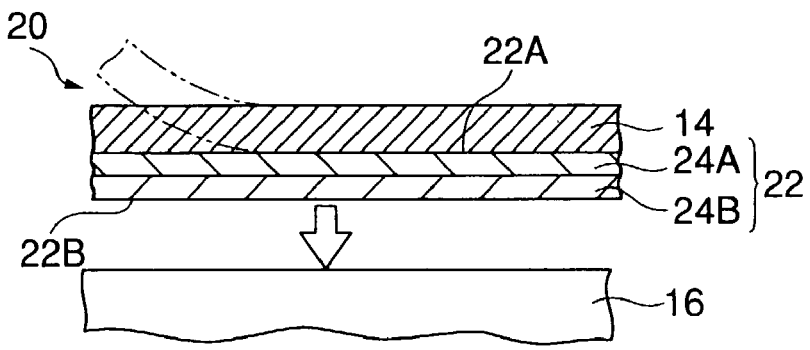
FIG. 3 is an enlarged diagrammatical cross-sectional view showing a liquid crystalline transfer sheet according to the second embodiment of the present invention.
Figure 4:
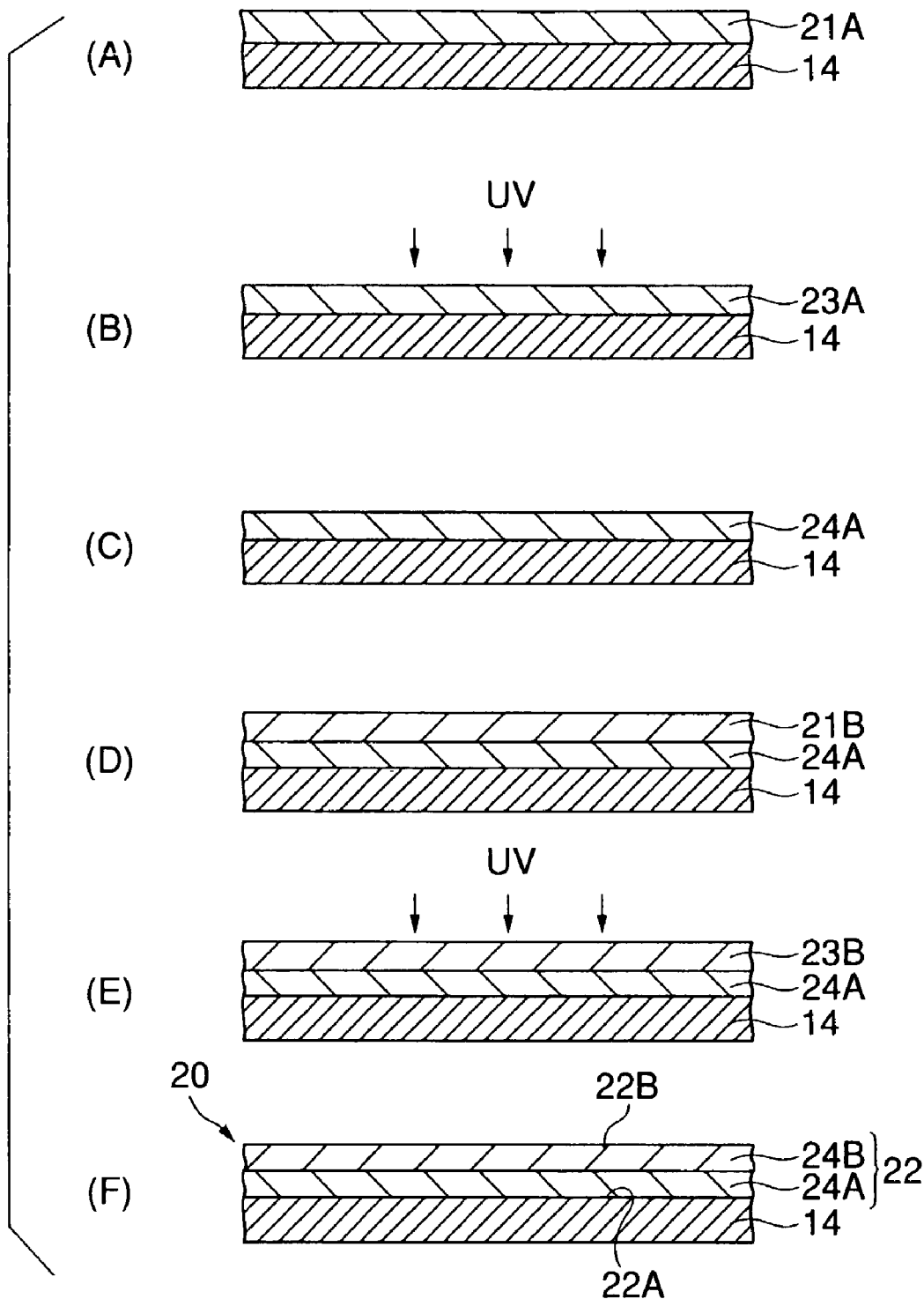
FIG. 4 is a diagrammatical cross-sectional view illustrating a process of producing the liquid crystalline transfer sheet shown in FIG. 3.

As shown in FIG. 3, a liquid crystalline transfer sheet 20 according to the second embodiment of the present invention includes a liquid crystal layer 22 composed of two (or three or more) thin liquid crystal layers 24A and 24B successively laminated, formed on the surface of a substrate 14 made of an oriented PET (polyethylene terephthalate) film, for example. This liquid crystal layer 22 is made so that it can be adhered to the substrate 14 with its adhering surface 22B, the surface on the side opposite to the substrate 14, and that it can be separated from the substrate 14 at its releasing surface 22A, the surface on the substrate 14 side. The hardness of the thin liquid crystal layer 24A that forms the releasing surface 22A at which the liquid crystal layer 22 is separated from the substrate 14 is made higher than that of the thin liquid crystal layer 24B that forms the adhering surface 22B with which the liquid crystal layer 22 is adhered to a receiving object 16. In the case where the thin liquid crystal layers 24A and 24B are made from polymerizable liquid crystalline molecules, the proportion of the hardness of the thin liquid crystal layer 24A to that of the thin liquid crystal layer 24B is determined by the proportion of the rate of residual double bonds of the liquid crystalline molecules in the thin liquid crystal layer 24A to that of the liquid crystalline molecules in the thin liquid crystal layer 24B like in the case of the liquid crystal layer 12 of the liquid crystalline transfer sheet 10 according to the above-described first embodiment. For instance, the rate of residual double bonds of the liquid crystalline molecules in the thin liquid crystal layer 24A provided on the releasing surface 22A side may be made 60% or less of that of the liquid crystalline molecules in the thin liquid crystal layer 24B provided on the adhering surface 22B side.

Next, by referring to FIG. 4, a process of producing the liquid crystalline transfer sheet 20 shown in FIG. 3 will be explained. The explanation is herein given by taking as an example a case where a cholesteric liquid crystalline monomer polymerizable by the application of ultraviolet light is used to form the liquid crystal layer 22.

A cholesteric liquid crystalline monomer solution containing a photopolymerization initiator is firstly prepared. This solution is applied, as indicated by reference numeral 21A in FIG. 4(A), to the surface of a substrate 14 made of the same oriented PET film as that used in the above described first embodiment and is then dried to remove the solvent, thereby forming an uncured thin liquid crystal layer 23A as shown in FIG. 4(B).

Next, as shown in FIG. 4(B), ultraviolet light is applied to this uncured thin liquid crystal layer 23A in an atmosphere of nitrogen (oxygen concentration: 0.5% or less) to cure this layer. A cured thin liquid crystal layer 24A is thus formed as shown in FIG. 4(C).

Thereafter, the same cholesteric liquid crystalline monomer solution as the above-described one is applied, as indicated by reference numeral 21B in FIG. 4(D), to the surface of the cured thin liquid crystal layer 24A in the manner as described above, thereby forming an uncured thin liquid crystal layer 23B as shown in FIG. 4(E).

As shown in FIG. 4(E), ultraviolet light is applied to this uncured thin liquid crystal layer 23B in an atmosphere of air (oxygen concentration: 0.5% or more) to cure this layer, thereby obtaining a cured thin liquid crystal layer 24B as shown in FIG. 4(F). A liquid crystalline transfer sheet 20 including a liquid crystal layer 22 composed of the cured thin liquid crystal layers 24A and 24B laminated is thus finally obtained.

To form a liquid crystal layer composed of three or more thin liquid crystal layers, the above-described steps (FIGS. 4(D) to 4(F)) are repeated to successively laminate thin liquid crystal layers in a number desired.

The thin liquid crystal layer 24A is oriented by the aligning action of the substrate 14 made of an oriented PET film. On the other hand, the thin liquid crystal layer 24B is oriented when it is brought into direct contact with the thin liquid crystal layer 24A that has been cured with the state of orientation maintained.

The thin liquid crystal layer 24A is cured in an atmosphere of nitrogen, while the thin liquid crystal layer 24B is cured in an atmosphere of air. Therefore, the degree of cure of the thin liquid crystal layer 24B becomes lower than that of the thin liquid crystal layer 24A. In other words, the hardness of the thin liquid crystal layer 24A, which forms the releasing surface 22A of the liquid crystal layer 22 at which the liquid crystal layer 22 is separated from the substrate 14, becomes higher than that of the thin liquid crystal layer 24B, which forms the adhering surface 22B of the liquid crystal layer 22 with which the liquid crystal layer 22 is adhered to a receiving object 16. Consequently, the adhesion between the thin liquid crystal layer 24B and the receiving object 16 becomes stronger than that between the thin liquid crystal layer 24A and the substrate 14.

It is possible to control the degree of cure of each thin liquid crystal layer 24A or 24B by adjusting the oxygen concentration of the atmosphere in which ultraviolet light is applied to the thin liquid crystal layer 24A or 24B. Alternatively, the degree of cure of each thin liquid crystal layer 24A or 24B can also be controlled by adjusting the amount of the photopolymerization initiator to be added, the amount of ultraviolet light to be applied, or a combination of these two.

Figure 5:
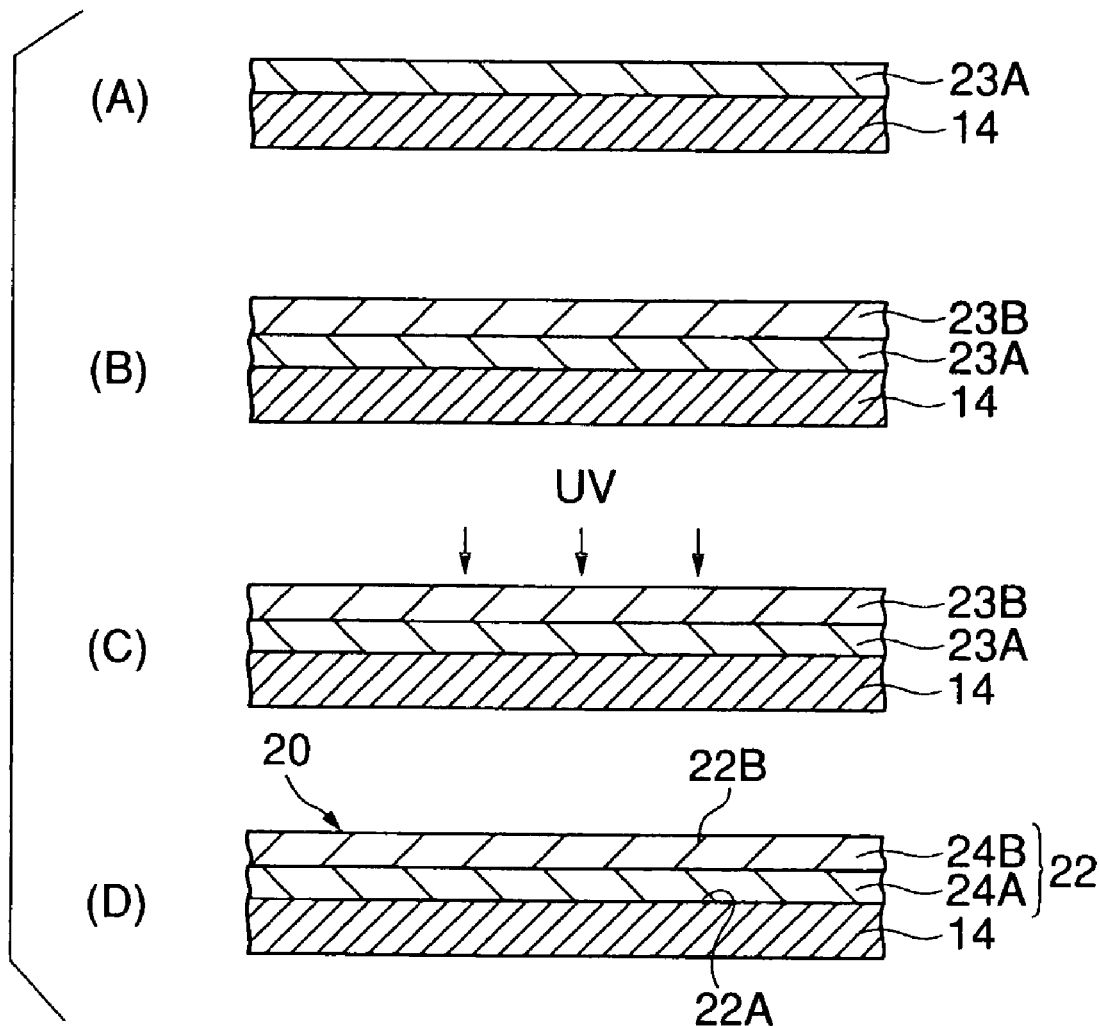
FIG. 5 is a diagrammatical cross-sectional view illustrating another process of producing the liquid crystalline transfer sheet shown in FIG. 3.

In the case where the degree of cure of each thin liquid crystal layer 24A or 24B is controlled by adjusting the amount of the photopolymerization initiator to be added, after successively laminating a plurality of uncured thin liquid crystal layers 23A and 23B (FIGS. 5(A) and 5(B)), ultraviolet light is applied only once to these thin liquid crystal layers 23A and 23B laminated, as shown in FIG. 5. A liquid crystalline transfer sheet 20 including a liquid crystal layer 22 composed of the cured thin liquid crystal layers 24A and 24B laminated can thus be obtained.

In the case where the degree of cure of each thin liquid crystal layer 24A or 24B is controlled by adjusting the oxygen concentration of the atmosphere in which ultraviolet light is applied, or by adjusting the amount of ultraviolet light to be applied, it is possible to use radiation such as an electron beam instead of ultraviolet light. In this case, a photopolymerization initiator may not be added to the cholesteric liquid crystalline monomer solution that is applied to the surface of the substrate 14.

According to the liquid crystalline transfer sheet 20 of the second embodiment of the present invention, the hardness of the thin liquid crystal layer 24A, which forms the releasing surface 22A of the liquid crystal layer 22 on the substrate 14 side, and the hardness of the thin liquid crystal layer 24B, which forms the adhering surface 22B of the liquid crystal layer 22 on the receiving object 16 side, are adjusted so that the adhesion between the adhering surface 22B of the liquid crystal layer 22 and the receiving object 16 will be stronger than that between the releasing surface 22A of the liquid crystal layer 22 and the substrate 14. It is therefore possible to securely stick, to the receiving object 16, the liquid crystal layer 22 composed of the plurality of thin liquid crystal layers 24A and 24B and, at the same time, to easily peel the substrate 14 from the liquid crystal layer 22. It is thus possible to securely and easily transfer the liquid crystal layer 22 to the receiving object 16 without damaging the liquid crystal layer 22, even if a release layer, easily separable adhesive layer or adhesive layer is not employed.

In the aforementioned first and second embodiments of the invention, ultraviolet light is applied from the liquid crystal layer side to the liquid crystal layer formed on the substrate 14. However, the present invention is not limited to this, and ultraviolet light may also be applied to the liquid crystal layer through the substrate 14 if the substrate 14 transmits or scarcely absorbs ultraviolet light. In this case, by controlling the thickness of the liquid crystal layer, the amount of the photopolymerization initiator to be added, the amount of ultraviolet light to be absorbed by the liquid crystal itself, or, if necessary, the amount of an ultraviolet light absorber to be added, the amount of ultraviolet light to be applied to the releasing surface of the liquid crystal layer may be made different from that of ultraviolet light to be applied to the adhering surface of the liquid crystal layer so that the ratio of the former to the latter will be approximately 10:6.

Further, in the above-described first and second embodiments, cholesteric liquid crystals having cholesteric phase, composed of liquid crystalline molecules are used to form the liquid crystal layers 12 and 22. The present invention, however, is not limited to this and liquid crystals of other types, such as chiral nematic liquid crystals or nematic liquid crystals, may also be used. In addition, materials for the substrate 14 are not limited to oriented films such as oriented PET films, and other film-like sheets can also be used. If a sheet having no aligning action on its surface unlike an oriented PET film is used as the substrate, it is necessary to form an alignment layer on one surface of the sheet that will be brought into contact with the releasing surface 12A or 22A of the liquid crystal layer 12 or 22.

The first and second embodiments of the invention have been explained by taking as an example a case where the liquid crystal layer is formed by the use of liquid crystalline molecules (liquid crystalline monomer or oligomer) polymerizable by the application of ultraviolet light. However, the present invention is not limited to this and is also applicable to a case where the liquid crystal layer is formed by the use of a polymeric liquid crystal. To produce a liquid crystalline transfer sheet including a liquid crystal layer made from a polymeric liquid crystal, a polymeric liquid crystal is firstly applied to the surface of a substrate having aligning action and is dried to form a liquid crystal layer, and a solvent is sprayed over the adhering surface of this liquid crystal layer to increase the solvent concentration of the adhering surface, thereby softening this surface. A liquid crystalline transfer sheet in which the surface hardness of the liquid crystal layer is lower on the adhering surface side than on the releasing surface side can thus be obtained.

EXAMPLES

Example 1

A toluene solution (cholesteric liquid crystal solution) containing 33% of a cholesteric liquid crystalline monomer having molecular helical structure (cholesteric phase) obtained by mixing a nematic liquid crystal and a chiral agent was firstly prepared.

To this cholesteric liquid crystal solution was added 5% of a photopolymerization initiator, for example, Irg 184, Irg 369 or Irg 651 (available from Ciba Specialty Chemicals K.K., Japan).

This cholesteric liquid crystal solution was applied to a 50-μm thick oriented PET film, substrate, by using a spinner and was dried at a temperature between normal temperatures (21° C.) and 80° C. to remove the solvent, thereby forming a 10-μm thick uncured cholesteric liquid crystal layer.

To this cholesteric liquid crystal layer and the substrate, 20 mJ/cm² of ultraviolet light was applied from the cholesteric liquid crystal layer side in an atmosphere of air (oxygen concentration: approximately 20%) at a temperature of 21° C., thereby curing the cholesteric liquid crystal layer. A liquid crystalline transfer sheet as shown in FIG. 1 was thus produced. An extra-high pressure mercury vapor lamp was used as the light source of the ultraviolet light applied. The above-described intensity of ultraviolet light is a value obtained by measurement using a photodetector at 365 nm.

The liquid crystalline transfer sheet thus produced was superposed on a glass plate, receiving object, with the adhering surface of the liquid crystal layer on the side opposite to the oriented PET film, substrate, facing the surface of the glass plate. This was placed in a laminator to conduct thermocompression bonding under such lamination conditions that the roll temperature was 150° C., that the speed was 0.5 m/min and that the roll pressure was 0.3 MPa.

Thereafter, the liquid crystalline transfer sheet adhered to the glass plate was cooled to normal temperatures (21° C.) by dissipating the heat, and the oriented PET film, substrate, was peeled. It was easy to peel the oriented PET film, substrate, from the cholesteric liquid crystal layer; the cholesteric liquid crystal layer was thus securely transferred to the glass plate. Such a phenomenon was not observed in the course of separation that the cholesteric liquid crystal layer partially remained on the oriented PET film or that the cholesteric liquid crystal layer was damaged.

Examples 2 & 3

The procedure of Example 1 was repeated, provided that the thickness of the cholesteric liquid crystal layer was changed. A liquid crystal line transfer sheet including a 1-μm thick cholesteric liquid crystal layer was produced in Example 2, and a liquid crystalline transfer sheet including a 5-μm thick cholesteric liquid crystal layer was produced in Example 3.

Each liquid crystalline transfer sheet thus obtained was adhered to a glass plate via thermocompression bonding conducted in the same manner as in Example 1. The cholesteric liquid crystal layer of each liquid crystalline transfer sheet was successfully transferred to the glass plate.

Example 4

The same cholesteric liquid crystal solution as that prepared in Example 1 was applied to the surface of the same oriented PET film as that used in Example 1 to form an uncured cholesteric liquid crystal layer. To this uncured cholesteric liquid crystal layer, 10 mJ/cm² of ultraviolet light was applied from the uncured cholesteric liquid crystal layer side in an atmosphere of nitrogen (oxygen concentration: 0.5% or less) at a temperature of 21° C., thereby curing the cholesteric liquid crystal layer. A first thin liquid crystal layer was thus formed.

Next, on the surface of this first thin liquid crystal layer cured, a similar cholesteric liquid crystal layer was directly formed in the manner as described above. To the uncured cholesteric liquid crystal layer thus formed, 0.4 mJ/cm² of ultraviolet light was applied from the uncured cholesteric liquid crystal layer side in an atmosphere of nitrogen (oxygen concentration: 0.5% or less) at a temperature of 21° C. to cure this layer, thereby obtaining a second thin liquid crystal layer cured. A liquid crystalline transfer sheet including a cholesteric liquid crystal layer consisting of a laminate of the first and second thin liquid crystal layers cured was thus finally obtained.

In the above process, although the atmosphere in which ultraviolet light was applied to obtain the first thin liquid crystal layer was the same as that in which ultraviolet light was applied to obtain the second thin liquid crystal layer, the amount of ultraviolet light to be applied to obtain the first thin liquid crystal layer was made more than 20 times greater than that of ultraviolet light to be applied to obtain the second thin liquid crystal layer.

The liquid crystalline transfer sheet thus produced was adhered to a glass plate via thermocompression bonding conducted under the same lamination conditions as those described before. After cooling this laminate, the oriented PET film was peeled. The cholesteric liquid crystal layer was successively transferred to the glass plate. Such a phenomenon was not observed in the course of separation that the first thin liquid crystal layer partly remained on the oriented PET film or that the first or second thin liquid crystal layer was damaged.

Example 5

A cholesteric liquid crystal solution was applied to a glass plate, receiving object, and was cured to form a cholesteric liquid crystal film. Each one of the liquid crystalline transfer sheets produced in Examples 1 to 4 was superposed on the above glass plate coated with the cholesteric liquid crystal film, with the cholesteric liquid crystal layer of the liquid crystalline transfer sheet facing the cholesteric liquid crystal film on the glass plate. This was placed in a laminator to conduct thermocompression bonding under such lamination conditions that the roll temperature was 150° C., that the speed was 0.5 m/min and that the roll pressure was 0.3 MPa.

Thereafter, each laminate thus obtained was cooled to normal temperatures (21° C.) by dissipating the heat; and the oriented PET film, substrate, was peeled. It was easy to peel the oriented PET film, substrate, from the cholesteric liquid crystal layer of each liquid crystalline transfer sheet; the cholesteric liquid crystal layer itself was securely transferred to the glass plate covered with the cholesteric liquid crystal film, receiving object.

Comparative Example

In order to compare with the liquid crystalline transfer sheet made in Example 1, a comparative liquid crystalline transfer sheet was made in the following manner: the same cholesteric liquid crystal solution as that prepared in Example 1 was applied to the surface of the same oriented PET film as that used in Example 1 to form an uncured cholesteric liquid crystal layer, and 10 mJ/cm² of ultraviolet light was applied in an atmosphere of nitrogen (oxygen concentration: 0.5% or less) at a temperature of 21° C. to cure the cholesteric liquid crystal layer.

The liquid crystalline transfer sheet thus produced was adhered to a glass plate under the same lamination conditions as in Example 1, but it was impossible to transfer the liquid crystal layer to the glass plate.

With respect to the liquid crystalline transfer sheet of Example 1 and the comparative liquid crystalline transfer sheet, the peel strength between the substrate (oriented PET film) and the cholesteric liquid crystal layer and that between the cholesteric liquid crystal layer and the glass plate were measured. The results are shown in Table 1.

TABLE 1

| Cholesteric Liquid Crystalline Transfer Sheet | Peel Strength $10^{-3}$ N/mm | |
| --- | --- | --- |
| | Substrate-Cholesteric Liquid Crystal Layer | Cholesteric Liquid Crystal Layer-Glass Plate |
| Example 1 | 2 | 12 |
| Comp. Ex. | 2 | 2 |

As is clear from the data shown in Table 1, in the case of the comparative liquid crystalline transfer sheet adhered to the glass plate, the peel strength between the substrate and the cholesteric liquid crystal layer is equal to that between the cholesteric liquid crystal layer and the glass plate. In the case of the liquid crystalline transfer sheet of Example 1 adhered to the glass plate, on the other hand, there is a great difference between the two peel strengths, and the peel strength between the cholesteric liquid crystal layer and the glass plate is stronger. This shows that the cholesteric liquid crystal layer was easily transferred to the glass plate without causing unfavorable separation from the glass plate.

Further, with respect to the liquid crystalline transfer sheet of Example 1 and the comparative liquid crystalline transfer sheet, the rate of conversion (degree of polymerization) of the liquid crystalline molecules in the vicinity of the releasing surface of the liquid crystal layer and that of the liquid crystalline molecules in the vicinity of the adhering surface of the liquid crystal layer were determined; and the results obtained are shown in Table 2. (It is noted that the former rate of conversion and the latter rate of conversion are proportional to the degree of cure of the liquid crystalline molecules in the vicinity of the releasing surface of the liquid crystal layer and that of the liquid crystalline molecules in the vicinity of the adhering surface of the liquid crystal layer, respectively.)

TABLE 2

| Cholesteric Liquid Crystalline Transfer Sheet | Example 1 | | Comparative Example | |
| --- | --- | --- | --- | --- |
| | Transfer Side | Substrate Side | Transfer Side | Substrate Side |
| Rate of Conversion of Cholesteric Liquid Crystalline Molecules | 1.6 | 2.7 | 2.6 | 2.6 |

In this measurement, the rate of conversion of C=C bonds present in the region extending from the surface of each cholesteric liquid crystal layer to the depth of 2–3 µm was confirmed by using IR (infrared) spectra.

The cholesteric liquid crystalline molecules have acrylic groups, and application of ultraviolet light causes cleavage of C=C bonds; the reaction thus proceeds and the molecules are cured.

The data shown in Table 2 demonstrate the following: in the comparative liquid crystalline transfer sheet, the rate of conversion (i.e., degree of cure) of the liquid crystalline molecules on the releasing surface side is nearly equal to that of the liquid crystalline molecules on the adhering surface side; while in the liquid crystalline transfer sheet of Example 1, the rate of conversion of the liquid crystalline molecules on the adhering surface side is 59% of that of the liquid crystalline molecules on the releasing surface side.

With respect to the liquid crystalline transfer sheet of Example 1 and the comparative liquid crystalline transfer sheet, the state of the surface (adhering surface) with which the liquid crystalline transfer sheet was adhered to the receiving object was analyzed by the use of a pendulum impact tester for rigid body (manufactured by A & D Company). The results are respectively shown in FIGS. 6 and 7.

Figure 6:
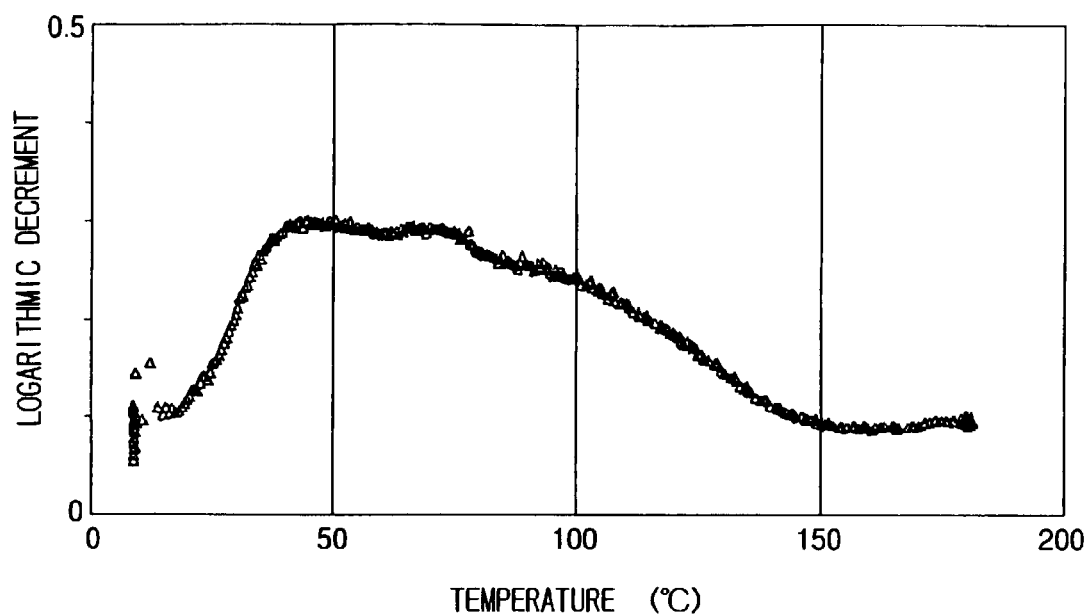
FIG. 6 is a graph showing the relationship between logarithmic decrement and temperature on the adhering surface of a liquid crystalline transfer sheet according to one example of the present invention.
Figure 7:
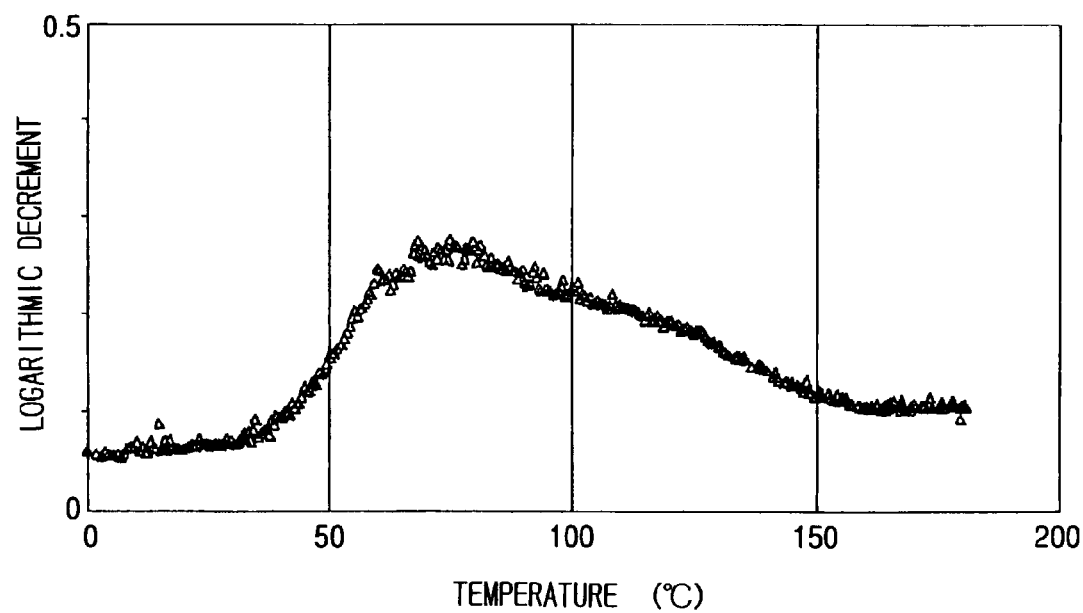
FIG. 7 is a graph showing the relationship between logarithmic decrement and temperature on the adhering surface of a comparative liquid crystalline transfer sheet.

FIGS. 6 and 7 show the relationship between logarithmic decrement, one index of the surface hardness of a test sample, and temperature, where when the logarithmic decrement is greater, the surface is softer and has better adhesive properties.

It can be understood from FIGS. 6 and 7 that the liquid crystalline transfer sheet of Example 1 has strong adhesion to the receiving object and also a high rate of residual double bonds of the liquid crystalline molecules as compared with the comparative liquid crystalline transfer sheet.

Further, from comparison between FIG. 6 and FIG. 7, it can also be understood that the logarithmic decrement of the liquid crystalline transfer sheet of Example 1 is significantly great on the low temperature side. This means that a fluid component is present, even at low temperatures, on the surface of the cholesteric liquid crystal layer of the liquid crystalline transfer sheet of Example 1. Such a cholesteric liquid crystal layer shows fluidity over a wide range of temperature, so that the distortion of the liquid crystal layer tends to be eliminated in the course of transfer of the liquid crystal layer to a receiving object. The adhesion between the liquid crystal layer and the receiving object is thus improved. It is noted that the fluid component herein means uncured cholesteric liquid crystalline molecules and refers to a monomer or an oligomer having a relatively low molecular weight.

What is claimed is:

1. A liquid crystalline transfer sheet comprising:
    a substrate; and
    a liquid crystal layer formed on a surface of the substrate, the liquid crystal layer having an adhering surface on a side of the liquid crystal layer opposite from the substrate, the adhering surface being capable of adhering to a receiving object, and a releasing surface on a substrate side-of the liquid crystal layer, the releasing surface being separable from the substrate;
    wherein:
    a surface hardness of the liquid crystal layer is lower on the adhering surface side than on the releasing surface side; and
    the liquid crystal layer is made from polymerizable liquid crystalline molecules, and a rate of residual double bonds of the liquid crystalline molecules in a vicinity of the adhering surface of the liquid crystal layer is higher than that of the liquid crystalline molecules in a vicinity of the releasing surface of the liquid crystal layer.

2. The liquid crystalline transfer sheet according to claim 1, wherein the rate of residual double bonds of the liquid crystalline molecules in the vicinity of the releasing surface of the liquid crystal layer is 60% or less of that of the liquid crystalline molecules in the vicinity of the adhering surface of the liquid crystal layer.

3. The liquid crystalline transfer sheet according to claim 1, wherein the liquid crystal layer is composed of a plurality of thin liquid crystal layers successively laminated.

4. The liquid crystalline transfer sheet according to claim 3, wherein each thin liquid crystal layer is made from polymerizable liquid crystalline molecules, and a rate of residual double bonds of the liquid crystalline molecules in the thin liquid crystal layer in a vicinity of the adhering surface is higher than that of the liquid crystalline molecules in the thin liquid crystal layer in a vicinity of the releasing surface.

5. The liquid crystalline transfer sheet according to claim 4, wherein the rate of residual double bonds of the liquid crystalline molecules in the thin liquid crystal layer that forms the releasing surface is 60% or less of that of the liquid crystalline molecules in the thin liquid crystal layer that forms the adhering surface.

6. The liquid crystalline transfer sheet according to claim 1, wherein the liquid crystal layer made from the liquid crystalline molecules is cholesteric.

7. The liquid crystalline transfer sheet according to claim 1, wherein the substrate is an oriented film.

8. The liquid crystalline transfer sheet according to claim 1, wherein an alignment layer is formed on one surface of the substrate, the surface being brought into contact with the releasing surface of the liquid crystal layer.

9. A process of producing a liquid crystalline transfer sheet comprising a substrate and a liquid crystal layer, the process comprising:
   forming the liquid crystal layer on the substrate using liquid crystalline molecules polymerizable by application of radiation; and
   curing the liquid crystal layer by application of radiation in an atmosphere of air so that a surface hardness of the liquid crystal layer is lower on an adhering surface on a side of the liquid crystal layer opposite from the substrate than on a releasing surface on a substrate side of the liquid crystal layer;
   wherein:
   the adhering surface is capable of adhering to a receiving object;
   the releasing surface is separable from the substrate; and
   a rate of residual double bonds of the liquid crystalline molecules in a vicinity of the adhering surface of the liquid crystal layer is higher than that of the liquid crystalline molecules in a vicinity of the releasing surface of the liquid crystal layer.

10. The process of producing a liquid crystalline transfer sheet according to claim 9, wherein the atmosphere of air is an atmosphere with an oxygen concentration of 0.5% or more.

11. A process of producing a liquid crystalline transfer sheet comprising a substrate and a liquid crystal layer composed of a plurality of thin liquid crystal layers, the process comprising:
   forming a first thin liquid crystal layer on a substrate using liquid crystalline molecules polymerizable by application of radiation;
   curing the first thin liquid crystal layer by application of radiation;
   forming a second thin liquid crystal layer on the cured first thin liquid crystal layer using liquid crystalline molecules polymerizable by application of radiation;
   curing the second thin liquid crystal layer by application of radiation; and
   forming and curing additional thin liquid crystal layers as necessary to obtain the plurality of thin liquid crystal layers;
   wherein:
   the liquid crystal layer has an adhering surface on a side opposite from the substrate, the adhering surface being capable of adhering to a receiving object;
   the liquid crystal layer has a releasing surface on a substrate side, the releasing surface being separable from the substrate;
   a degree of cure of each thin liquid crystal layer is controlled so that a hardness of the liquid crystal layer in a vicinity of the adhering surface is lower than that of the liquid crystal layer in a vicinity of the releasing surface; and
   a rate of residual double bonds of the liquid crystalline molecules in a vicinity of the adhering surface of the liquid crystal layer is higher than that of the liquid crystalline molecules in a vicinity of the releasing surface of the liquid crystal layer.

12. The process of producing a liquid crystalline transfer sheet according to claim 11, wherein the degree of cure of each thin liquid crystal layer is controlled by adjusting an oxygen concentration of an atmosphere in which radiation is applied to the thin liquid crystal layer.

13. The process of producing a liquid crystalline transfer sheet according to claim 11, wherein the degree of cure of each thin liquid crystal layer is controlled by adjusting an amount of radiation to be applied to the thin liquid crystal layer.

14. A process of producing a liquid crystalline transfer sheet comprising a substrate and a liquid crystal layer composed of a plurality of thin liquid crystal layers, the process comprising:
   laminating a desired number of thin liquid crystal layers on a substrate using liquid crystalline molecules polymerizable by application of ultraviolet light; and
   curing the laminated thin liquid crystal layers by application of ultraviolet light;
   wherein:
   the liquid crystal layer has an adhering surface on a side opposite from the substrate, the adhering surface being capable of adhering to a receiving object;
   the liquid crystal layer has a releasing surface on a substrate side, the releasing surface being separable from the substrate;
   a degree of cure of each thin liquid crystal layer is controlled by adjusting an amount of a photopolymerization initiator to be added to the thin liquid crystal layer so that a hardness of the liquid crystal layer in a vicinity of the adhering surface is lower than that of the liquid crystal layer in a vicinity of the releasing surface; and
   a rate of residual double bonds of the liquid crystalline molecules in a vicinity of the adhering surface of the liquid crystal layer is higher than that of the liquid crystalline molecules in a vicinity of the releasing surface of the liquid crystal layer.

* * * * *